United States Patent Office 2,728,760
Patented Dec. 27, 1955

2,728,760

REACTION PRODUCT OF HYDRAZINE AND ITS DERIVATIVES WITH DIAZOPHENOL AND ITS DERIVATIVES, AND SALTS OF SUCH PRODUCTS

Joseph F. Kenney, Milford, Conn., assignor to Remington Arms Company, Inc., Bridgeport, Conn., a corporation of Delaware No Drawing. Application December 9, 1952,
Serial No. 325,042

6 Claims. (Cl. 260—140)

This invention relates to a class or group of compounds which are identified generally as products of the reaction of diazophenol and its derivatives with hydrazine and its derivatives, and the salts of such reaction products. These compounds are characterized by a tetrazene-1 linkage

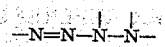

joining a phenolic ring. Their characteristic structure is:

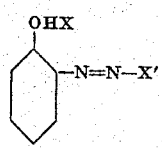

in which X is hydrazine or a hydrazine derivative, and X' is hydrazine or a hydrazine derivative in which an NH$_2$ group has been reduced to NH and bonded to the diazo group.

Typical of this class of compounds is the product secured by reacting one mole of diazodinitrophenol with two moles of hydrazine, as follows:

*Preparation of the hydrazine salt of 2,4-dinitro-6-(tetrazeno-1)-phenol*

15 grams of diazodinitrophenol are suspended in 100 cc. of alcohol and 100 cc. of water. 10 cc. of hydrazine hydrate is dissolved in 50 cc. of water, and the hydrazine solution is added to the diazodinitrophenol suspension with stirring, which is continued for about 30 minutes. The reaction appears to be

I

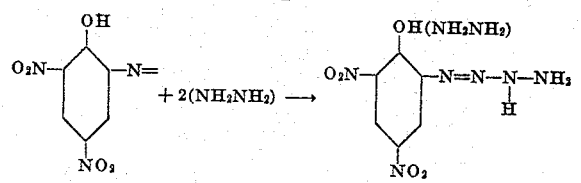

This reaction product, which precipitates in red-brown needles, is the hydrazine salt of 2,4-dinitro-6-(tetrazeno-1)-phenol.

*Preparation of a potassium salt of 2,4-dinitro-6-(tetrazeno-1)-phenol*

To a suspension of 5 grams of the washed and dried product of Reaction I above in 50 cc. of water, there is added with stirring a solution of 10 grams of potassium nitrate in 50 cc. of water, the stirring being continued for 20 minutes. A dark red crystalline precipitate resulted from the reaction.

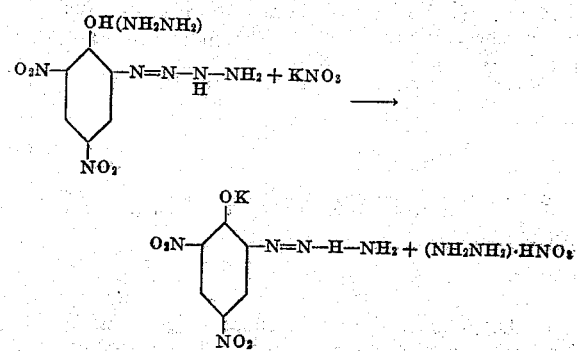

Numerous other salts of 2,4-dinitro-6-(tetrazeno-1)-phenol have been prepared and their explosive properties determined on a temperature gradient bar as follows:

| Salt | Explosion Points | | |
|---|---|---|---|
| | in 5 sec. at— | in 2 sec. at— | Instantaneous at— |
| | °C. | °C. | °C. |
| Sodium | 196 | 200 | 205 |
| Potassium | 193 | 195 | 208 |
| Strontium | 212 | 215 | 217 |
| Calcium | 180 | 182 | 192 |
| Copper | 158 | 162 | 166 |
| Cadmium | 160 | 162 | 165 |
| Lithium | 200 | 205 | 209 |
| Lead | 160 | 163 | 167 |
| Silver | 192 | 196 | 200 |

The salts of the reaction product of diazodinitrophenol and derivatives of hydrazine likewise have explosive properties. For example, the potassium, lead and silver salts of acetohydrazide, methyl hydrazine, and acetone hydrazone have been prepared and found very explosive. The invention contemplates the use, among others, of hydrazine derivatives of the types

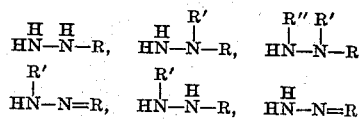

in which R, R' and R" are any atom or group of atoms capable of the indicated combinations.

Typical of such hydrazine derivatives are:

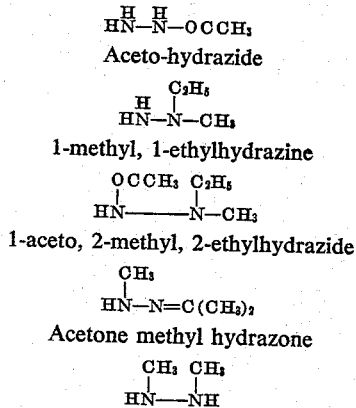

The explosive properties of the novel compounds above set forth are such that they are particularly adapted for use as the explosive or sensitizing ingredient of ammunition priming compositions, replacing wholly or in part such explosives as tetrazene and its salts, normal or basic lead styphnate, etc. Such priming compositions may comprise any of the known oxidizers, abrasives and fuels, although the efficiency of the new compounds may obviate the necessity for the use of a fuel.

Typical priming compositions are as follows:

|  | A | B |
|---|---|---|
| Lead 2,4-dinitro-6-(tetrazeno-1)-phenol | 10 |  |
| Potassium 2,4-dinitro-6-(tetrazeno-1)-phenol |  | 40 |
| Lead Styphnate | 32 |  |
| Potassium Nitrate |  | 27 |
| Lead Nitrate | 25 |  |
| Glass | 33 | 33 |

In the usual sensitivity (2 ounce weight) and powder ignition tests, the above compositions and a commercial mixture tested for comparison showed the following:

|  | A | Com'l | B | Com'l |
|---|---|---|---|---|
| Sensitivity (inches): |  |  |  |  |
| Average | 4.66 | 4.46 | 5.34 | 4.78 |
| Standard Deviation | 1.46 | 1.15 | 1.89 | 1.51 |
| Barrel Time (milliseconds): |  |  |  |  |
| Average |  |  | 2.88 | 3.17 |
| Standard Deviation |  |  | .067 | .267 |

Diazodinitrophenol is typical of many derivatives of diazophenol which, like diazophenol itself, combine with hydrazine and its derivatives to form compounds which, either as themselves or as metallic salts, have useful properties. For example, the lead salt of the reaction product of diazomononitrophenol and hydrazine explodes in 5 seconds at 145° C. and instantaneously at 160° C. The salts of the reaction product of diazophenol with hydrazine, likewise, have explosive properties. Other examples of derivatives of diazophenol usable in accordance with the present invention are 2,4 dichloro diazophenol; 3 amino diazophenol; and 2 methyl diazophenol.

What is claimed is:
1. The compound 2,4-dinitro-6-(tetrazeno-1)-phenol.
2. A metallic salt of the compound of claim 1.
3. The lead salt of the compound of claim 1.
4. The copper salt of the compound of claim 1.
5. The cadmium salt of the compound of claim 1.
6. The potassium salt of the compound of claim 1.

References Cited in the file of this patent

UNITED STATES PATENTS

| 1,511,771 | Rathsburg | Oct. 14, 1924 |
| 1,862,295 | Burns | June 7, 1932 |

OTHER REFERENCES

Clark: Ind. & Eng. Chem., vol. 25 (1933), pp. 663–4.